Sept. 1, 1925.

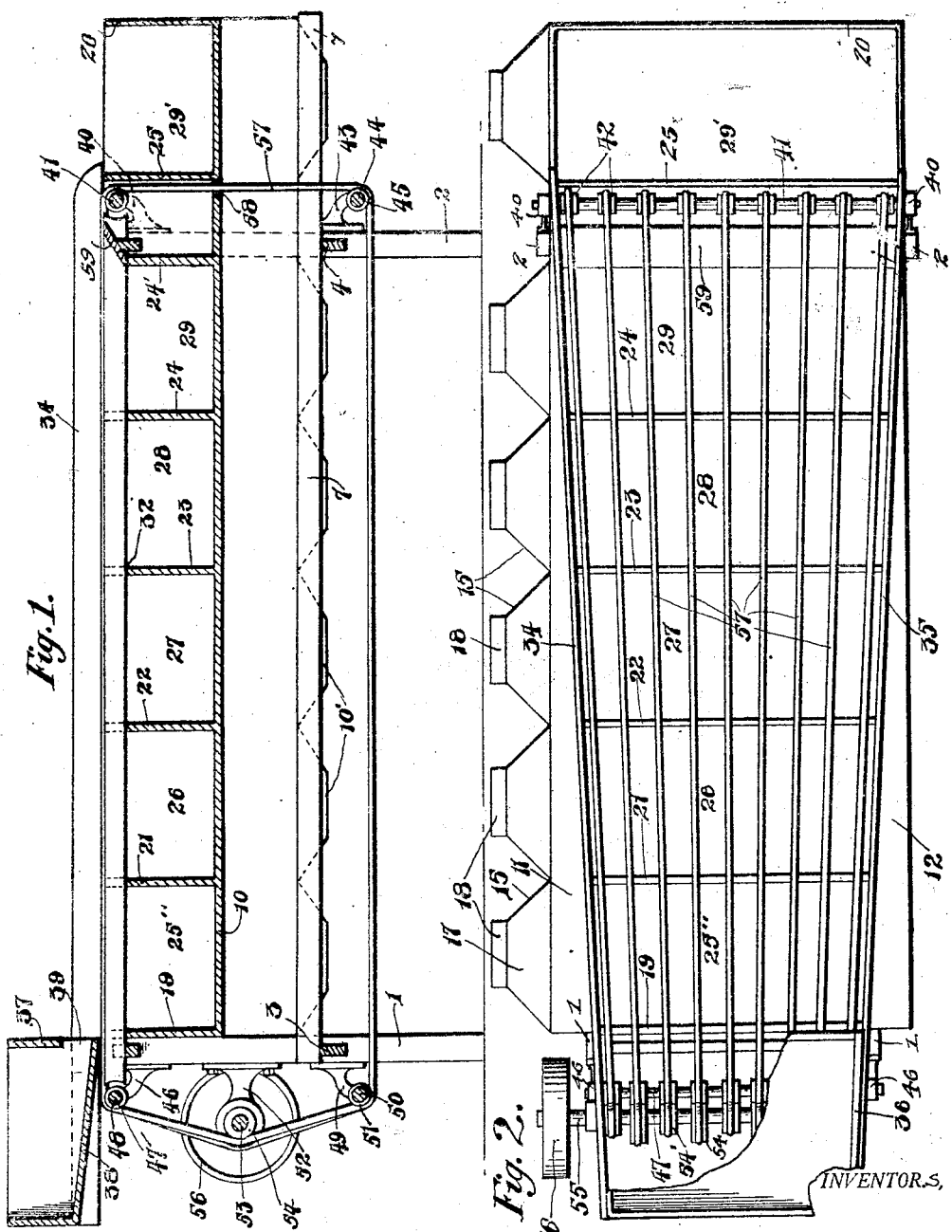

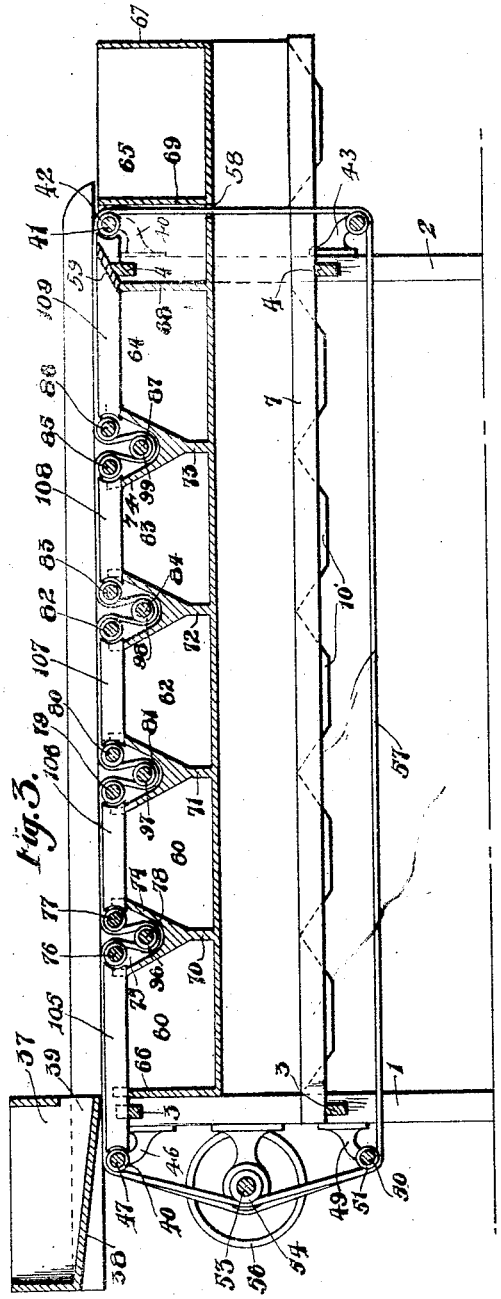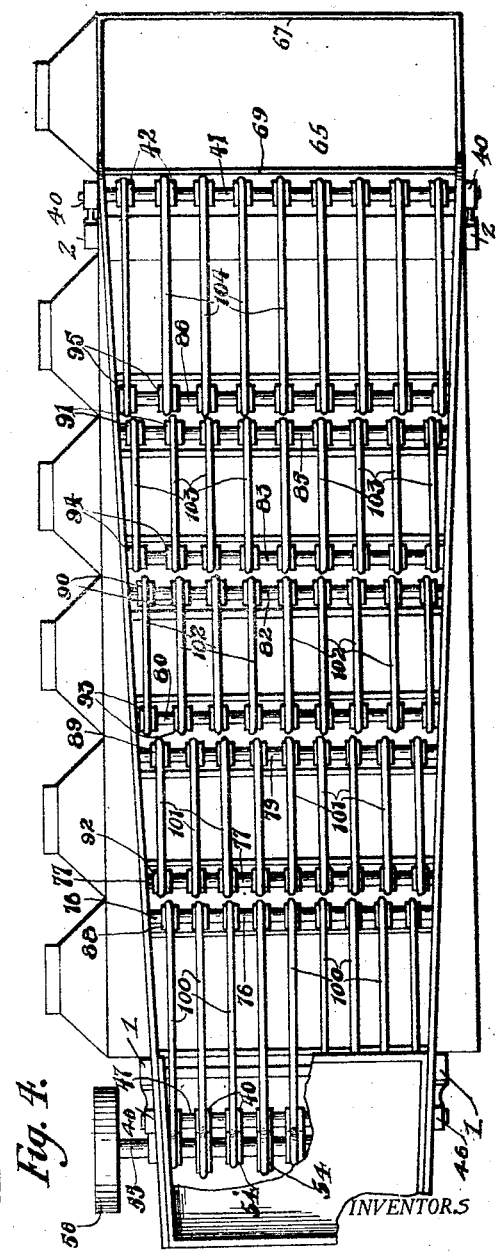

P. WADE ET AL

GRADING MACHINE

Filed March 5, 1925   3 Sheets-Sheet 3

1,552,366

INVENTORS.
Phelps Wade, C. J. Smith.
BY
Geo. P. Kimmel  ATTORNEY.

Patented Sept. 1, 1925.

1,552,366

UNITED STATES PATENT OFFICE.

PHELPS WADE AND CHAUNCEY J. SMITH, OF MACON, GEORGIA.

GRADING MACHINE.

Application filed March 5, 1925. Serial No. 13,234.

*To all whom it may concern:*

Be it known that we, PHELPS WADE and CHAUNCEY J. SMITH, citizens of the United States, residing at Macon and Macon, respectively, in the county of Bibb and State of Georgia, have invented certain new and useful Improvements in Grading Machines, of which the following is a specification.

This invention relates to a grading machine designed primarily for sizing nuts, fruits and vegetables, but it is to be understood that a grading machine, in accordance with this invention, can be used for any purpose for which it is found applicable, and the invention has for its object, to provide in a manner as hereinafter set forth, a machine of the class referred to, with means for effectively grading nuts, fruits and vegetables, as to size, when occasion requires.

Further objects of the invention are to provide, in a manner as hereinafter set forth, a grading machine which is simple in its construction and arrangement, strong, durable, compact, thoroughly efficient in its use, conveniently operated, readily assembled, and comparatively inexpensive to set up.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings, wherein like reference characters denote corresponding parts throughout the several views:—

Figure 1, is a longitudinal sectional view of a grading machine in accordance with this invention.

Figure 2, is a top plan thereof, partly broken away.

Figure 3, is a longitudinal sectional view of a modified form.

Figure 4, is a top plan view of the form shown in Figure 3, partly broken away.

Figure 9:
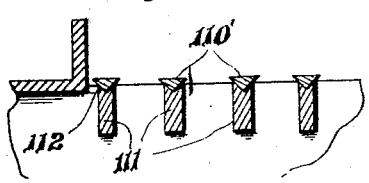
Figure 10:
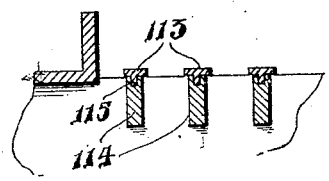
Figure 11:
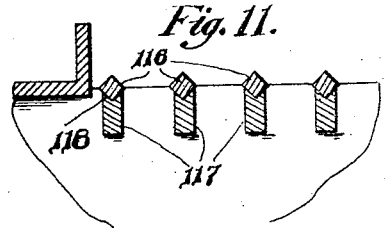

Figures 9, 10, and 11 are fragmentary views in section of other modified forms of grading members and their supports.

Referring to Figures 1, 2, 5 and 6 of the drawings, the grading machine, as illustrated thereby, includes a rectangular supporting frame having two pair of vertically disposed standards. The standards of each pair are arranged in spaced relation, and the standards of one pair are indicated at 1, and those of the other pair at 2. The standards are of the same height. The standards 1 are connected together by a pair of superposed spaced horizontally disposed end bars 3. The standards 2 are connected together by a pair of superposed spaced horizontally extending end bars 4. The bars 3 are arranged in alignment with the bars 4. One of the standards 1 is connected to one of the standards 2 by a pair of superposed spaced longitudinally extending side bars 5, 6. The bar 5 is arranged below the upper end of the standards to which it is attached and constitutes a support. The other standard 1 is connected to the other standard 2 by a longitudinally extending side bar 7, which opposes and is of greater height than the side bar 6 and constitutes a support. The top edge of the side bars 5 and 7 are bevelled as at 8 and said bars co-act as a supporting means for a purpose to be hereinafter referred to.

Supported by the frame is a collector referred to generally by the reference character 9 and which extends from one side and at one end of the frame. The collector 9 comprises an inclined bottom 10 which is mounted on the bars 5 and 7, which form a supporting means for the bottom 10, and the latter is formed with a series of V-shaped extensions 10' which project outwardly from the bar 7. The top of the collector is formed from a pair of spaced longitudinally extending triangular-shaped plate strips 11, 12, which are oppositely disposed with respect to each other and of less length than the length of the collector and further of a length as to terminate at a point removed from the rear end of the collector. The inner side wall of the collector is indicated at 13 and it is connected to or formed integral with the upper end of the bottom 10 and the outer side of the strip 11. The outer side of the collector is formed of a series of downwardly inclined portions 14 and a series of pairs of oppositely inclined portions 15, 16. Each pair of inclined portions 15 and 16 extend towards each other, are connected to or integral with the portion 14, depend therefrom and are connected to or formed integral with an extension 10'. Each of the portions 14, in connection with a pair of portions 15 and 16, and further in connection with an extension 10', provides a funnel-shaped outlet 17 for a compartment to be presently referred to. The funnel-shaped outlet 17, at its outer end, is formed with a polygonal-shaped extension 18 disposed in a plane transversely with respect to the frame of the machine. The portions 14, at their upper ends, are connected with or formed integral with the strip 11. The forward end wall of the collector is indicated at 19 and which is connected to the rear face of the standards 1 and the rear end wall of the collector is indicated at 20 and which is positioned rearwardly with respect to the standards 2. Extending transversely of the collector 9 is a series of spaced partitions 21, 22, 23, 24, 24' and 25. The partition 21 in connection with the wall 19 provides a compartment 25", the partitions 21 and 22 a compartment 26, the partitions 22 and 23 a compartment 27, and partitions 23 and 24 a compartment 28, the partitions 24 and 24' a compartment 29, and partition 25 and end wall 20 a compartment 29'. Each of said compartments has a funnel-shaped discharge nozzle 17 projecting therefrom and with the discharge opening 30 of the nozzle formed by the extension 18.

Supported by the upper end bars 3, 4, as well as by the end walls 19, 20 and partitions 21, 22, 23, 24, 24' and 25 is a series of longitudinally extending combined grader supports 31, which also constitute guides for the graders. The supports 31 are arranged in sidewise relation and spaced from each other and the spaces between the supports 31 gradually increase in width from the forward to the rear end of the machine. The supports 31 project forwardly from the upper end bar 3 and rearwardly from the upper end bar 4 and said supports further extend through the upper portions of the walls 19, 20 and partitions 21 to 25. The supports 31 are welded or fastened to the upper end bars 3, 4, walls 19, 20 and partitions 21 to 25 as at 32, for maintaining the supports 31 in spaced relation. The upper edge of each of the supports 31 is formed with a seat, throughout the length thereof, as indicated at 33 and upon said seat travels a grader.

Formed integral of the inner side of the strip 11, is a retaining member 34 which is of a length to project forwardly and rearwardly of the supporting frame and formed integral with the inner side of the strip 12 is a retaining member 35 of a length to project forwardly and rearwardly of the supporting frame. The retaining members 34 and 35 extend at an inclination and also in opposite direction with respect to each other, and the portions of said members which project forwardly of the supporting frame are indicated at 36, and connected therewith is a vertically disposed hopper 37 having an inclined bottom 38, and a discharge opening 39, through which the articles to be graded are discharged upon the graders. The hopper 37 is arranged above the graders.

Secured to the standard 2, at the top thereof, and at each end, is a rearwardly extended upwardly disposed bracket 40, and mounted in said brackets 40 is a shaft 41, carrying an upper rear set or series of spaced grooved rollers 42. Secured to the standards 2, below the collector 9 are rearwardly directed downwardly disposed brackets 43, carrying a shaft 44, provided with a lower rear set or series of spaced grooved rollers 45. Secured to the standards 1, and projecting forwardly thereof are upwardly disposed brackets 46, carrying a shaft 47 provided with an upper forward set or series of spaced grooved rollers 48. Secured to the standards 1 below the brackets 46, are forwardly projecting and downwardly disposed brackets 49, in which is mounted a shaft 50 provided with a lower forward set or series of spaced grooved rollers 51. Projecting forwardly from the standards 1, between the brackets 46 and 49, are forwardly extending brackets 52 in which is journalled a shaft 53 provided with two sets 54, 54' of spaced grooved rollers. The rollers of the set 54 are of greater diameters than and alternately disposed with respect to the rollers of the set 54' for a purpose to be presently referred to. The shaft 53 projects outwardly from one of the brackets 52, as indicated at 55, and carries a drive pulley 56, adapted to be connected to an operating means, not shown. The shaft 53 projects forwardly with respect to the shafts 48 and 50, and the brackets 52 are of greater length than the brackets 46 and 49. The brackets 40 and 46 are extended upwardly and the brackets 43 and 49 are extended downwardly to depend below the lower bars 3, 4.

The forward sets of rollers are arranged forwardly with respect to the forward end of the collector and the lower forward set of rollers is positioned below the bottom of the collector. The rear sets of rollers are arranged forwardly with respect to the rear end of the collector and the lower rear set of rollers is positioned below the bottom of the collector.

The number of graders, correspond to the number of supports 31, as well as the number of grooved rollers carried by a shaft. Each of the shafts referred to are provided with the same number of grooved rollers but the shafts 41 and 44 are of greater length than the shafts 47 and 50. The rollers on the shafts 41, 44 are spaced a like distance, and furthermore are spaced a greater distance apart than the rollers on the shafts 47, 50 or, in other words, the forward ends of the supports 31 are arranged in alignment with the rollers 48 and the rear end of the supports 31 are arranged in alignment with the rollers 42. Each of the graders is indicated at 57 and is in the form of an endless conveyor, and as shown in Figures 1, 3, 6 and 8 cylindrical in cross-section, but the graders can be of any desirable cross sectional contour. The seats 33 are semi-circular in cross section so that as the graders travel lengthwise of the support 31 they will engage in the seats 33 and be guided during their travel upon the supports. The graders travel over the rollers 54, 54', 42, 45, 51, and 47, and owing to the arrangement of the rollers 54, 54', each alternate grader will travel at a different speed to force the nuts, etc., to rotate while being conveyed, or in other words during the travel of the graders the nuts, etc., mounted thereon will be caused to revolve.

The bottom 10 is provided with a series of openings 58 for passage of the graders 57 to the rollers 45. The graders 57 travel downwardly between the partitions 24' and 25. The partition 24' is secured against the forward face of the standards 2 and the partition 25 is spaced from the rear face thereof. An inclined strip 59 is arranged at the upper end of the partitions 24', and which extends over the upper end bar 4 and has the supports 31 connected thereto.

The spaces between the graders 57 gradually decrease in width from the forward to the rear end of the machine and the graders extend rearwardly of the standards 2 and down between the compartments 29, 29'.

As the bottom 10 inclines inwardly in one direction, from one side to the other side of the machine, it requires that the lower stretches of the graders be positioned below the lower bars 3, 4, when travelling from the rollers 45 to the rollers 51, and the depending brackets 43, 49, which carry the shafts 44, 50 provide means whereby the lower stretches of the graders will be held permanently clear of the bottom 10. As the shaft 53 is positioned forwardly with respect to the shafts 48 and 50 and between these latter, the rollers 54, 54' on the shaft 53 will maintain the graders taut so that they will seat directly in the top of the supports 31 during the travel of the upper stretches of the graders. It is obvious that the shaft 53 can be provided with any suitable means for adjusting the tension of the graders when desired, and it is thought unnecessary to show such means.

The articles to be graded are placed in the hopper 37 and discharged therefrom on the travelling graders 57 and these latter are guided in a gradually widening path by the supports 31. As the articles to be graded are being conveyed they are revolved until they reach a point on the grader wide enough for them to fall through into one of the compartments. The articles too large to fall through the graders at any point are discharged therefrom into the compartment 29'. The rollers co-act with the supports to provide guides for the graders 42 and 48 so that the space between these latter will gradually widen between the upper portion of the graders when said portions are travelling from the front to the rear of the machine.

In the form shown in Figures 3, 4, 7 and 8, the differences in construction between said form and that shown in Figures 1 and 2 will be now set forth and otherwise than as stated with respect to such differences, the construction shown in Figures 3, 4, 7 and 8 is the same as that shown in Figures 1 and 2. The difference between the construction shown in Figures 3 and 4, over that shown in Figures 1 and 2 reside solely in the manner of positioning the graders with respect to a compartment and the construction of the partitions to form certain of the compartments. The compartments of the collector, in Figures 3 and 4, are indicated at 60, 61, 62, 63, 64, 65. The forward end wall of the collector is indicated at 66 and the rear end wall at 67. The collector includes partitions 68 and 69 which correspond to the partitions 24' and 25 shown in Figure 1. The compartment 60 is formed by the forward end wall and partition 70, the compartment 61 by the partitions 70, 71, the compartment 62 by the partitions 71, 72, the compartment 63 by the partitions 72, 73, and the compartment 64 by the partitions 73, 68. The partitions 70, 71, 72, 73 extend transversely of the collector and each is formed with an enlarged V-shaped portion 74, chambered intermediate its ends as at 75.

Mounted in the upper portion of the partition 70 is a pair of spaced shafts 76, 77 and below said shafts a shaft 78. Mounted in the upper portion of the partition 71 is a pair of spaced shafts 79, 80 and below the said shafts a shaft 81. Mounted in the upper portion of the partition 72 is a pair of spaced shafts 82, 83 and below the said shafts a shaft 84 and mounted in the upper portion of the partition 73 is a pair of spaced shafts 85, 86 and below the said shafts a shaft 87. Carried by the shafts 76, 79, 82 and 85 is a series of spaced grooved rollers 88, 89, 90 and 91 respectively. Carried by the shafts 77, 80, 83 and 86 is a series of spaced grooved rollers. The rollers on the shaft 77 are spaced a greater distance than the rollers on the shaft 76. The rollers on the shaft 77 are spaced the same distance as the rollers on the shaft 79. The rollers on the shaft 80 are spaced a greater distance than the rollers on the shaft 79. The rollers on the shaft 80 are spaced the same distance as the rollers on the shaft 82. The rollers on the shaft 83 are spaced a greater distance than the rollers on the shaft 82. The rollers on the shaft 86 are spaced a greater distance than the rollers on the shaft 85 and the rollers on the shaft 86 are spaced the same distance as the rollers 42 on the shaft 41.

Figure 5:
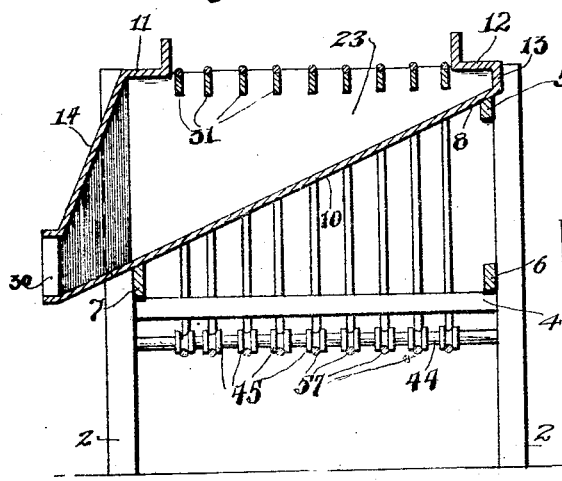
Figure 5, is a cross sectional view of the form shown in Figure 1.
Figure 7:
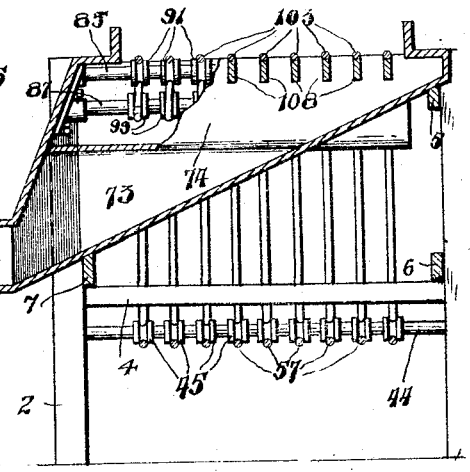
Figure 7, is a cross sectional view of the form shown in Figure 3.
Figure 6:
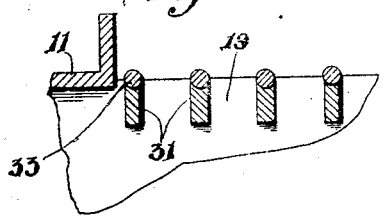
Figure 6, is a fragmentary view upon an enlarged scale and in section of the form shown in Figure 1.
Figure 8:
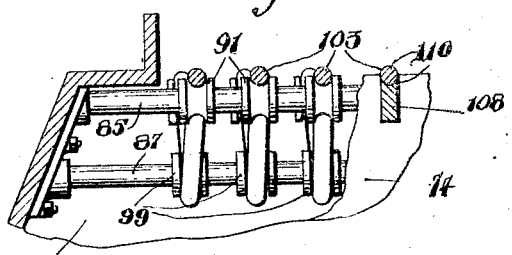
Figure 8, is a fragmentary view upon an enlarged scale of the form shown in Figure 3.

Mounted on the shafts 78, 81, 84 and 87 is a series of spaced grooved rollers 96, 97, 98 and 99, respectively. With reference to Figure 8 the disposition of the rollers on a lower shaft with respect to the rollers on the pair of upper shafts is shown and the arrangement is such that the rollers 96 are out of alignment with the rollers 88, 92, the rollers 97 out of alignment with the rollers 89, 93, the rollers 98 out of alignment with respect to rollers 90, 94, and the rollers 95 out of alignment with respect to the rollers 91, 95. The rollers 88 are in alignment with the rollers 48 on the shaft 47.

The grader elements 57, when performing their grading function, at the upper portion of the machine, owing to the disposition of the guide rollers and shafts, as referred to, provide portions of the graders to travel in parallel planes and spaced from each other, but with the spaces between the portions of the grader elements travelling over a rear compartment being of greater width than the spaces between the grader elements travelling over a forward compartment. The portions of the grader elements 57, having narrowest spaces therebetween and which coact with the compartment 60, are indicated at 100. The portions coacting with the compartment 61 are indicated at 101, the portions coacting with the compartment 62 are indicated at 102, the portions coacting with the compartment 63 are indicated at 103, and the portions coacting with the compartment 64 are indicated at 104. The spaces between the portions 101 are wider than between the portions 100, the spaces between the portions 102 are wider than between the portions 101, the spaces between the portions 103 are wider than between the portions 102 and the spaces between the portions 104 are wider than between the portions 103.

Associated with the portions 100 are a set of combined supports and guides 105, with the portions 101 a set of combined supports and guides 106, with the portions 102 a set of combined supports and guides 107, with the portions 103 a set of combined supports and guides 108 and with the portions 104 a set of combined supports and guides 109. The combined supports and guides of each set are equally spaced with respect to each other and each of the guides of each set is provided with a seat 110 upon which travels that portion of the grader with which the guide is associated. The set of combined supports and guides 105 are mounted in the upper end bar 3, the forward end wall 66 and one side of the partition 70 and further project forwardly from the upper end bar 3. The set of combined supports and guides are mounted in the other side of the partition 70 and one side of the partition 71. The set of combined supports and guides 70 are mounted in the other side of the partition 71 and one side of the partition 72. The set of combined supports and guides 108 are mounted in the other side of the partition 72 and one side of the partition 73, and the set of combined supports and guides 101 are mounted in the other side of the partition 73 and in the partitions 68, 69 and upper end bar 4. The upper ends of the partitions 70, 71, 72 and 73, as well as the partitions 68, 69 and forward end walls 66 are notched for the reception of the combined supports and guides and further for the purpose of maintaining them in spaced relation. The set of combined supports and guides 105 are arranged in alignment with the rollers 48 and 88, the set 106 in alignment with the rollers 92 and 89, the set 107 in alignment with the rollers 93 and 90, the set 108 in alignment with the rollers 94 and 91 and the set 109 in alignment with the rollers 95 and 42.

With reference to the modification shown in Figure 9, it relates solely to a different shape of grader element 110′ and it is triangular in cross section. The combined support and guide 111 has a V-shaped seat 112 for the grader member 110.

With reference to modification shown in Figure 10, it relates to a change in form of the grader element 113 and which is T-shaped in cross section and the combined support and guide 114 is formed with a groove 115 to receive the stem of the grader member 113.

With reference to the modification shown in Figure 11, it relates solely to a change in form of the grader member 116 and which is polygonal in contour and the combined support and guide 117 is formed with a V-shaped seat 118 to receive the member 116.

With respect to the operation of the modified construction disclosed in Figures 3, 4, 7 and 8, the articles to be graded are placed in the hopper 37 and discharged therefrom on to the portion 100 of the grader members and as the articles to be graded reach a place on the grader members wide enough for them to fall through they pass into a compartment arranged below the portions of the grader members through which the articles pass and the articles too large to pass through the grader members at any of the portions thereof are dropped off into the compartment 65.

It is thought the many advantages of a grading machine, in accordance with this invention, can be readily understood, particularly in view of the fact that the spaces between the grading elements have the width thereof progressively increased to provide for the separation of the articles conveyed by the grader elements, in accordance with the size thereof, and although the preferred embodiments of the invention are as disclosed and illustrated, yet changes in the details of construction can be had which will fall within the scope of the invention as claimed.

What we claim is:—

1. A grading machine comprising an open top collector provided with a series of transversely extending compartments discharging at their outer ends, transversely disposed forward upper and lower shafts each carrying a set of equi-distant spaced guide positioned rollers exteriorly of the forward end of the collector, transversely disposed rear upper and lower shafts each carrying a set of equi-distant spaced guide rollers positioned forwardly of the rear end of the collector, the said lower sets arranged below the bottom of the collector, the rollers of each rear set spaced a greater distance apart than the rollers of each forward set, said upper shafts arranged in alignment, said lower shafts arranged in alignment, and said upper shafts arranged in alignment with said lower shafts, spaced combined guide and supporting elements arranged in the open top of said collector and each grooved directly in its top edge, endless combined article conveying and grading members having stretches thereof travelling and seating in said grooves and against said sets of rollers and further having stretches travelling below the bottom of said collector throughout, and means interposed between and forwardly of the forward sets of rollers and simultaneously engaging with said members for driving them synchronously.

2. A grading machine comprising an open top collector provided with a series of transversely extending compartments discharging at their outer ends, transversely disposed forward upper and lower shafts each carrying a set of equi-distant spaced guide positioned rollers exteriorly of the forward end of the collector, transversely disposed rear upper and lower shafts each carrying a set of equi-distant spaced guide rollers positioned forwardly of the rear end of the collector, the said lower sets arranged below the bottom of the collector, the rollers of each rear set spaced a greater distance apart than the rollers of each forward set, said upper shafts arranged in alignment, said lower shafts arranged in alignment, and said upper shafts arranged in alignment with said lower shafts, spaced combined guide and supporting elements arranged in the open top of said collector and each grooved directly in its top edge, endless combined article conveying and grading members having stretches thereof travelling and seating in said grooves and against said sets of rollers and further having stretches travelling below the bottom of the collector throughout, and means interposed between and forwardly of the forward sets of rollers and simultaneously engaging said members for synchronously driving alternate members at different speed with respect to the speed of the other of said members.

3. A grading machine comprising an open top collector provided with a series of transversely extending compartments discharging at their outer ends and each having the bottom thereof inclining downwardly from its inner towards its outer end, said compartments extended laterally from one side of said collector, transversely disposed forward upper and lower shafts each carrying a set of equi-distant spaced guide rollers positioned exteriorly of the forward end of the collector, transversely disposed rear upper and lower shafts each carrying a set of equi-distant spaced guide rollers positioned forwardly of the rear end of the collector, the said lower sets of rollers positioned below the bottom of the collector, the rollers of each rear set spaced a greater distance apart than the rollers of each forward set, said upper shafts arranged in alignment, said lower shafts arranged in alignment, and said upper shafts arranged in alignment with said lower shafts, spaced combined guide and supporting elements arranged in the open top of said collector and each grooved directly in its top edge, endless combined article conveying and grading members having stretches thereof travelling and seating in said grooves and against said sets of rollers and further having stretches thereof travelling below the bottom of said collector throughout, and means interposed between and forwardly of the forward sets of rollers and simultaneously engaging said members for driving them synchronously.

4. A grading machine comprising an open top collector provided with a series of transversely extending compartments discharging at their outer ends, spaced sets of spaced parallel combined guide and supporting elements arranged in the open top of said collector and each set positioned over a compartment, the space formed between each pair of elements of one set being greater than the space formed between each pair of elements of an adjacent set, guide rollers opposing the ends of each element of a set, endless combined article conveying and grading members travelling on said elements and rollers, and means for driving said members.

5. A grading machine comprising an open top collector provided with a series of transversely extending compartments discharging at their outer ends, spaced sets of spaced parallel combined guide and supporting elements arranged in the open top of said collector and each set positioned over a compartment, the space formed between each pair of elements of one set being greater than the space formed between each pair of elements of an adjacent set, guide rollers opposing the ends of each element of a set, endless combined article conveying and grading members travelling on said elements and rollers, means for driving said members, and means arranged below said rollers for directing said members when passing from a rear set of elements onto a forward set of elements.

6. A grading machine comprising a series of travelling endless conveying and supporting elements, means for driving said elements, and means for positioning spaced stretches of one element spaced from and in parallelism throughout with spaced stretches of an adjacent element during the travel of the elements, the distance between the rear stretches of the elements being greater than the distance between the forward stretches of said elements.

7. A grading machine comprising a series of travelling endless conveying and supporting elements, means for driving said elements, means for positioning spaced stretches of one element spaced from and in parallelism throughout with spaced stretches of an adjacent element during the travel of the elements, the distance between the rear stretches of the elements being greater than the distance between the forward stretches of said elements, and a pair of guide rollers for each of the stretches of said elements.

8. A grading machine comprising a series of travelling endless conveying and supporting elements, means for driving said elements, means for positioning spaced stretches of one element spaced from and in parallelism throughout with spaced stretches of an adjacent element during the travel of the elements, the distance between the rear stretches of the elements being greater than the distance between the forward stretches of said elements, and a pair of guide rollers for each of the stretches of said elements, the guide rollers for the rear stretches of said elements being spaced from and out of alignment with respect to the guide rollers for the forward stretches of said elements.

In testimony whereof, we affix our signatures hereto.

PHELPS WADE.
CHAUNCEY J. SMITH.